Patented Dec. 12, 1933

1,938,642

UNITED STATES PATENT OFFICE 1,938,642

SYNTHETIC RESINS AND THE MANUFACTURE THEREOF

Arthur Runyan, Valparaiso, Ind., assignor to Sinclair Refining Company, New York, N. Y., a corporation of Maine No Drawing. Application April 15, 1931
Serial No. 530,425

3 Claims. (Cl. 260—2)

This invention relates to the manufacture of synthetic resins; more particularly the invention relates to a new synthetic resin and a new method of producing synthetic resins.

I have found that tri-phenyl phosphate or tri-cresyl phosphate react with calcium oxide, barium oxide, zinc oxide and magnesium oxide, under appropriate conditions, to form new and valuable synthetic resins.

For example: one molecular weight of tri-cresyl phosphate is heated to a temperature of 600-640° F. under a reflux condenser. At this temperature three molecular weights of calcium oxide are added to the hot tri-cresyl phosphate, the heating being temporarily suspended. As the vigor of the resulting reaction subsides the temperature declines. When the temperature falls to 475-500° F. the heating is resumed and continued until the reaction product, when cooled, solidifies to form a synthetic resin hard at ordinary temperature.

Tri-phenyl phosphate may be substituted for the tri-cresyl phosphate and the other oxides mentioned may be substituted for the calcium oxide in the foregoing example. Small amounts of tri-oxymethylene, for example, may be added during the resinification; in amounts corresponding to any phenol or cresol liberated by the reaction. Drying oils such as linseed oil and tungoil and natural resins such as the varnish resins and rosins may be incorporated in the product during resinification. The addition of drying oils in amounts approximating 5–10% (by weight) on the synthetic resin or of natural resins in amounts approximating 5–20% on the synthetic resin, for example, adds to the toughness of the product.

The synthetic resin produced in accordance with the foregoing example is light amber in color and water-resistant. It may be used in thermo-plastic molding and in varnish, lacquer and impregnating compositions. Fibrous materials impregnated with this synthetic resin may be cured under heat and pressure to form materials having excellent electrical and mechanical properties.

I claim:

1. In the manufacture of synthetic resins, the improvement which comprises resinifying a mixture of an ester of the class consisting of tri-phenyl phosphate and tri-cresyl phosphate and a metallic oxide of the class consisting of calcium oxide, barium oxide, zinc oxide and magnesium oxide at temperatures approximating 500–600° F.

2. An improved synthetic resin consisting of a resinified mixture of an ester of the class consisting of tri-phenyl phosphate and tri-cresyl phosphate and a metallic oxide of the class consisting of calcium oxide, barium oxide, zinc oxide and magnesium oxide.

3. In the manufacture of synthetic resins, the improvement which comprises heating an ester of the class consisting of tri-phenyl phosphate and tri-cresyl phosphate to a temperature of approximately 600°–640° F., adding a metallic oxide of the class consisting of calcium oxide, barium oxide, zinc oxide and magnesium oxide to the mass, allowing the temperature of the mass to fall to approximately 475°–500° F., and heating the mass until a resinous material, which will harden at ordinary temperatures, is formed.

ARTHUR RUNYAN.